J. L. ROGERS.
ELECTRIC ALARM ATTACHMENT FOR JOURNAL BEARINGS.
APPLICATION FILED AUG. 28, 1911.

1,041,514.　　　　　　　　　　Patented Oct. 15, 1912.

Inventor
J. E. Rogers.
by H. B. Willson & co.
Attorneys

Witnesses

UNITED STATES PATENT OFFICE.

JAMES EDWARD ROGERS, OF BELOIT, KANSAS.

ELECTRIC ALARM ATTACHMENT FOR JOURNAL-BEARINGS.

1,041,514.   Specification of Letters Patent.   Patented Oct. 15, 1912.

Application filed August 28, 1911. Serial No. 646,421.

*To all whom it may concern:*

Be it known that I, JAMES EDWARD ROGERS, a citizen of the United States, residing at Beloit, in the county of Mitchell and State of Kansas, have invented certain new and useful Improvements in Electric Alarm Attachments for Journal-Bearings; and I do declare the following to be a full, clear, and exact description of the invention, such as will enable others skilled in the art to which it appertains to make and use the same.

This invention relates to improvements in automatic electric alarms for journal or shaft bearings.

One object of the invention is to provide an electric alarm mechanism adapted to be applied to the journal boxes of machinery, shafting, or any form of bearing whereby when the same becomes heated an alarm will be sounded at any desired point thereby indicating the condition of the bearing in time to prevent any damage which might result from the overheating thereof.

A further object is to provide a device of this character which will be simple, and inexpensive in construction, efficient and reliable in operation and which may be connected with an annunciator or similar indicating mechanism whereby the machine or the particular bearing to which the device is attached will be indicated.

With these and other objects in view, the invention consists of certain novel features of construction, and the combination and arrangement of parts as will be more fully described and claimed.

Figure 1:
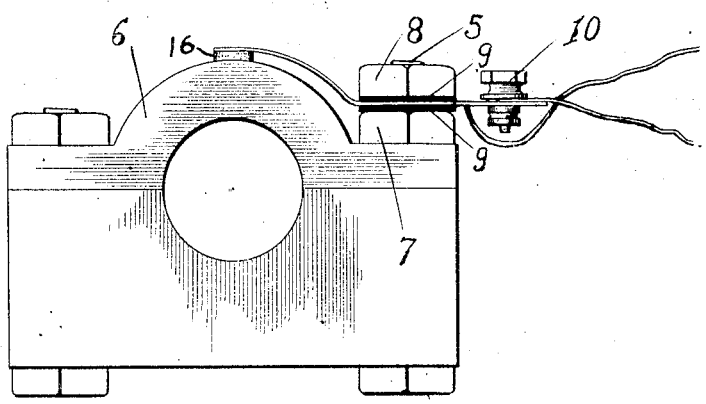
Figure 2:
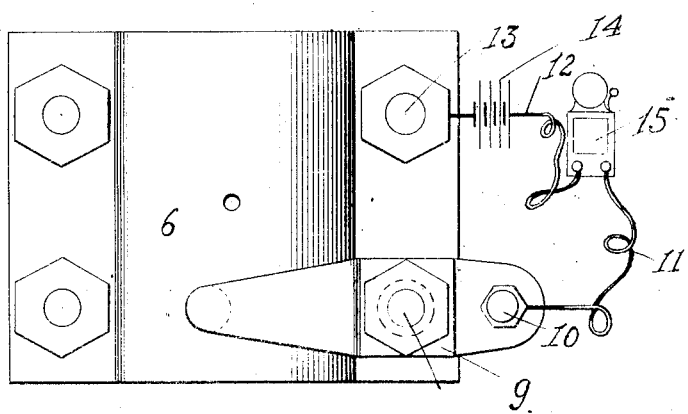
Figure 3:
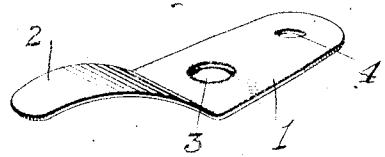

In the accompanying drawings: Figure 1 is an end view of a journal bearing showing the invention applied thereto; Fig. 2 is a top plan view of the same; Fig. 3 is a detail perspective view of the automatic switch or circuit closer of the invention.

In the embodiment of the invention, I have illustrated the same in connection with a bearing consisting of a base member 6', an upper member formed in the shape of an arched cap plate 6, and bolts 5 passing vertically upward through said members at either side of the arch and having nuts 7 on their upper ends, while their heads 5' are beneath the base member 6 as seen in Fig. 1.

In carrying out the invention I provide a circuit closer or switch comprising a plate 1 adapted to be secured to the journal bearing at any suitable position and in any suitable manner, said plate being here shown as having on its inner end an integral spring contact arm or blade 2 which in the present instance is shown as being curved upwardly from the attaching plate. In the present instance the attaching plate 1 is shown as having a flat body provided with two holes 3 and 4, the former of which is of sufficient size to loosely surround one of the fastening bolts 5 which secures the cap plate 6 of the bearing in place as shown by the dotted circle in Fig. 2; and the plate 1 is clamped between the cap fastening nut 7 and a clamping nut 8 on the upper portion of the bolt as shown. On the bolt 5 and between the opposite sides of the plate 1 and the adjacent surfaces of the nuts 7 and 8 are arranged washers 9 formed of mica or any other suitable insulating material whereby the circuit closer is fully insulated from the nuts. The hole 3 in the plate 1 has a diameter considerably greater than the diameter of the bolt thus preventing any possibility of a contact occurring between the bolt and the plate 1.

Engaging the hole 4 in what might be called the heel at the outer end of the attaching plate 1 is a binding screw 10 to which is connected the terminal of one of the current conducting wires 11 of an electric circuit, the other wire 12 of which is connected in any suitable manner with the journal bearing and is here shown as being clamped beneath another cap-fastening nut on a bolt 13. In the circuit formed by the conducting wires 11 and 12 is arranged a battery 14 or other source of electrical supply and a bell or other form of alarm 15. The alarm 15 may be located near the bearing or at any desired distant point. What might be called the toe of the contact blade or arm 2 of the circuit closer when the latter is arranged as herein shown and described, is deflected or sprung upward slightly and projects over and a short distance above the cap of the bearing and is spaced above and normally held out of contact therewith by a disk 16 of suitable fusible material. The disk is preferably formed of tallow which is quickly melted when the bearing becomes heated to a slight degree, thus permitting the contact arm to spring down into engagement with the cap 6 thereby completing the circuit through the cap and the bolt 13 to which the current conducting wire 12 is connected.

By constructing the circuit closer and alarm mechanism as herein shown and described it will be seen that the same may be applied to any form of journal bearing and that the alarm may be arranged at a distant point thus permitting the various machines in a factory or mill to be connected to a central point in the office or room of the engineer or operator and it will also be understood that an annunciator of any suitable form may be arranged in or connected with the circuit and the particular machine or the location of the heated bearing may be indicated so that no time will be lost in ascertaining and relieving the heated bearing before any damage therefrom has occurred.

Aside from the wires and the battery and alarm, this attachment therefore comprises only one ordinary nut, two washers of insulating material, and the circuit closer plate the hole 3 in which is of sufficient size to pass loosely over any ordinary bolt likely to be used on a journal bearing. The toe of the plate is sufficiently long and flexible to permit it to be deflected upward so that it will rest upon the top of the cap plate near the center of the same, and the heel of said circuit closer is sufficiently long to carry the binding screw 10 out beyond the edge of the bearing so that the wire will not come into contact with the latter. The other terminal may be attached to any part of or bolt through the bearing, as its function is simply to make electrical connection therewith.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as claimed.

Having thus described my invention, what I claim is:

The combination with a journal bearing consisting of a base member, an arched cap plate overlying the same, bolts passing upward through said member and plate, and nuts on the upper ends of the bolts resting on the upper face of the plate along its edges; of an electric alarm, the circuit wires leading therefrom, connections between one terminal and the cap plate, a circuit closer consisting of a plate having a flat body and an upbent toe, the former pierced with a relatively large hole adapted to loosely surround one of said bolts and a smaller hole in its heel, and the toe extending upward over said cap plate; a disk of fusible insulating material carried by the tip of the toe and resting on said plate, insulating washers above and below the body of said plate, a clamping nut on said bolt over the uppermost washer, and a binding screw in said smaller hole connected with the remaining terminal.

In testimony whereof I have hereunto set my hand in presence of two subscribing witnesses.

JAMES EDWARD ROGERS.

Witnesses:
 FRANK E. BLOOD,
 VERNIE R. ROGERS.